(12) United States Patent
Anderson et al.

(10) Patent No.: US 9,656,863 B2
(45) Date of Patent: May 23, 2017

(54) METHOD AND APPARATUS FOR FEEDING MUNICIPAL SOLID WASTE TO A PLASMA GASIFIER REACTOR

(71) Applicant: Air Products and Chemicals, Inc., Allentown, PA (US)

(72) Inventors: Alan Donald Anderson, Baytown, TX (US); Francis Peter Petrocelli, Allentown, PA (US); Frank Stephen Winger, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 546 days.

(21) Appl. No.: 13/721,846

(22) Filed: Dec. 20, 2012

(65) Prior Publication Data
US 2014/0175335 A1 Jun. 26, 2014

(51) Int. Cl.
| | | |
|---|---|---|
| *C01B 3/36* | (2006.01) | |
| *C01B 3/02* | (2006.01) | |
| *C10J 3/18* | (2006.01) | |
| *C10J 3/30* | (2006.01) | |
| *C10K 1/10* | (2006.01) | |

(Continued)

(52) U.S. Cl.
CPC ............... *C01B 3/02* (2013.01); *B01D 11/04* (2013.01); *C10J 3/18* (2013.01); *C10J 3/30* (2013.01); *C10K 1/101* (2013.01); *F23G 5/0276* (2013.01); *F23G 5/085* (2013.01); *H05H 1/44* (2013.01); *C10J 3/723* (2013.01); *C10J 2200/158* (2013.01); *C10J 2300/0946* (2013.01); *C10J 2300/0959* (2013.01); *C10J 2300/0973* (2013.01); *C10J 2300/0996* (2013.01); *C10J 2300/1238* (2013.01); *F23G 2201/301* (2013.01); *F23G 2205/121* (2013.01)

(58) Field of Classification Search
CPC ........ C10J 2300/1238; C10J 2300/0946; C10J 3/18; C10J 2300/0906; C10J 3/30; C10J 2300/0903; C10J 3/08; F23G 5/085; F23G 2204/201; F23G 2205/10; F23G 5/444; F23G 2900/50209; B09B 3/00
See application file for complete search history.

(56) References Cited

U.S. PATENT DOCUMENTS

| | | | |
|---|---|---|---|
| 2,868,631 A | † | 1/1959 | Woebcke |
| 3,841,465 A | | 10/1974 | Miller, Jr. et al. |

(Continued)

FOREIGN PATENT DOCUMENTS

| | | |
|---|---|---|
| CA | 2741386 | 1/2013 |
| CN | 102144126 | 8/2011 |

(Continued)

OTHER PUBLICATIONS

Niessan, Walter R., "Combustion and Incineration Processes", Fourth Edition, CRC Press, Boca Raton, FL 33487-2742, 2010.†

(Continued)

*Primary Examiner* — Imran Akram
(74) *Attorney, Agent, or Firm* — Amy Carr-Trexler

(57) ABSTRACT

A method and apparatus are described for supplying municipal solid waste (MSW), and/or other types of solid waste comprising both organic waste material and inorganic waste material, into a plasma gasifier reactor (PGR) in which the solid waste is to be processed.

11 Claims, 2 Drawing Sheets

(51) Int. Cl.
*B01D 11/04* (2006.01)
*H05H 1/44* (2006.01)
*F23G 5/027* (2006.01)
*F23G 5/08* (2006.01)
*C10J 3/72* (2006.01)

(56) References Cited

U.S. PATENT DOCUMENTS

| | | | |
|---|---|---|---|
| 4,283,252 A | 8/1981 | Reinhall | |
| 4,289,647 A † | 9/1981 | Tippmer | |
| 4,339,546 A * | 7/1982 | Randalls | C02F 11/12 204/170 |
| 4,881,862 A | 11/1989 | Dick | |
| 4,915,308 A | 4/1990 | Koenig | |
| 5,167,372 A | 12/1992 | Poggie et al. | |
| 5,311,830 A | 5/1994 | Kiss | |
| 5,346,142 A | 9/1994 | Miller et al. | |
| 5,389,347 A | 2/1995 | Hall | |
| 5,544,597 A * | 8/1996 | Camacho | 110/223 |
| 5,634,414 A | 6/1997 | Camacho | |
| 5,941,468 A | 8/1999 | Lewis et al. | |
| 6,155,182 A | 12/2000 | Tsangaris et al. | |
| 6,368,555 B1 | 4/2002 | Goeldner | |
| 6,971,323 B2 † | 12/2005 | Capote | |
| 6,987,792 B2 † | 1/2006 | Do | |
| 7,452,392 B2 † | 11/2008 | Nick | |
| 7,832,344 B2 † | 11/2010 | Capote | |
| 8,017,021 B1 | 9/2011 | Staples | |
| 2003/0192970 A1 | 10/2003 | Koenig | |
| 2004/0170210 A1 * | 9/2004 | Do | C10J 3/18 373/118 |
| 2005/0145578 A1 * | 7/2005 | Childs | F26B 23/028 210/768 |
| 2009/0064581 A1 | 3/2009 | Nielsen | |
| 2009/0133407 A1 † | 5/2009 | Sawyer | |
| 2009/0165322 A1 | 7/2009 | Lee et al. | |
| 2010/0115841 A1 | 5/2010 | Cork | |
| 2010/0199556 A1 | 8/2010 | Dighe et al. | |
| 2010/0199560 A1 | 8/2010 | Dighe et al. | |
| 2010/0219062 A1 * | 9/2010 | Leon Sanchez | C10J 3/466 204/157.43 |
| 2010/0287826 A1 * | 11/2010 | Hoffman | C10L 5/363 44/605 |
| 2010/0288618 A1 * | 11/2010 | Feerer et al. | 202/118 |
| 2011/0035990 A1 | 2/2011 | Kammerloher et al. | |
| 2011/0062013 A1 * | 3/2011 | Tsangaris | F23G 5/0276 202/209 |
| 2011/0104770 A1 * | 5/2011 | Tobey | C12P 7/04 435/140 |
| 2011/0248218 A1 | 10/2011 | Sutradhar et al. | |
| 2011/0290637 A1 * | 12/2011 | Kumar | C10J 3/723 204/164 |
| 2012/0061618 A1 | 3/2012 | Santoianni | |
| 2012/0121468 A1 | 5/2012 | Tsangaris et al. | |
| 2012/0121477 A1 | 5/2012 | Ali et al. | |
| 2012/0145012 A1 | 6/2012 | Koenig et al. | |
| 2012/0199795 A1 † | 8/2012 | Gorodetsky | |
| 2013/0203142 A1 * | 8/2013 | Young | C10K 3/026 435/161 |
| 2013/0252115 A1 * | 9/2013 | Hong | F23L 7/00 429/410 |

FOREIGN PATENT DOCUMENTS

| | | | | |
|---|---|---|---|---|
| CN | 102553880 | | 7/2012 | |
| GB | 2478797 A | | 9/2011 | |
| JP | 2008200544 A2 | | 9/2008 | |
| KR | WO 2012074156 A1 * | | 6/2012 | F23L 7/00 |
| WO | 0105910 A1 | | 1/2001 | |
| WO | 02/081600 A2 † | | 10/2002 | |
| WO | 2006073380 | | 7/2006 | |
| WO | 2006100191 | | 9/2006 | |
| WO | 2008011213 | | 1/2008 | |
| WO | 2010017945 A2 | | 2/2010 | |

OTHER PUBLICATIONS

Higman, C. et al., "Gasification", Second Edition, Elsevier Inc., 2008.†

Hauserman, W.B. et al., "Conclusions on Slagging, Fixed-Bed Gasification of Lignite", Final Report, DOE/FC/10565-2270 (DE87001059) May 1983.†

\* cited by examiner
† cited by third party

METHOD AND APPARATUS FOR FEEDING MUNICIPAL SOLID WASTE TO A PLASMA GASIFIER REACTOR

BACKGROUND OF THE INVENTION

The present invention relates to methods and apparatus for supplying municipal solid waste (MSW) and/or other types of solid waste comprising both organic (i.e. carbonaceous) waste material and inorganic waste material into a plasma gasifier reactor (PGR) in which the solid waste is processed to form a syngas (i.e. a gas comprising hydrogen, carbon monoxide and carbon dioxide) from the organic waste material and a molten slag from the inorganic waste material. In particular, the invention relates to feed apparatus for feeding solid waste into a plasma gasifier reactor, to solid waste processing apparatus comprising said feed apparatus and said plasma gasifier reactor, and to methods of feeding solid waste into a plasma gasifier reactor and processing solid waste to produce a syngas and a slag.

MSW, often colloquially referred to as trash, garbage, refuse or rubbish, can be disposed of in a variety of ways, including being used as landfill, or being processed via combustion, pyrolysis, gasification or plasma gasification so as to generate energy and/or useful chemicals.

The technique of plasma gasification has a number of benefits in terms of dealing with such forms of waste. In the gasification reaction the organic waste material present in the solid waste is gasified to produce a syngas via heating the waste material in environment that leads to gasification rather than combustion of the organic material (specifically, in an environment in which the oxygen concentration is not sufficient for combustion to take place). In plasma gasification one or more plasma torches (also referred to as plasma arc torches) are used to generate one or more plasma jets inside the PGR vessel that subject solid waste in the gasification zone of the PGR vessel to intense heat (with temperatures in excess of 2000° C. in the gasification zone being readily achievable via this method). The thermal energy supplied by the plasma torches to the solid waste is sufficient to gasify the organic waste materials (i.e. convert the organic waste materials into syngas) with high efficiency and to convert the inorganic waste materials into a molten slag. In this way, a high level of conversion of the organic waste material to a syngas can be achieved, whilst preventing the production of toxic and/or environmentally harmful species (such as furans, dioxins, $NO_x$ and $SO_x$) that might otherwise result if the material were to be combusted. The syngas can then be separately combusted to generate electrical power and/or can be used in further processes (such as the Fischer-Tropsch process) to generate useful chemicals, while the molten slag can be cooled to provide a cooled, inert slag that can be disposed of with greater ease and safety than the original waste material.

A number of plasma gasification processes and PGRs are known and have been described in the art, such as for example those described in US2010/199556A, US2010/199560A, US6155182A, WO2008/011213A, US2012/121477A, US2009/064581 A and US2012/121468A, the contents of which are incorporated herein by reference.

Nevertheless, alternative and improved methods and apparatus for processing MSW and other such types of solid waste via plasma gasification, and in particular alternative and improved methods and apparatus for feeding such waste into a plasma gasifier, are desired.

BRIEF SUMMARY OF THE INVENTION

According to a first aspect of the present invention, there is provided a feed apparatus for feeding solid waste (for example MSW) comprising both organic and inorganic waste material into a plasma gasifier reactor, the feed apparatus comprising:

a pre-compactor arranged and operable to receive the solid waste and to compact the solid waste to form a compacted solid waste;

a supply device arranged and operable to add a carbon bed source material to the compacted solid waste; and a feed device arranged and operable to receive the compacted solid waste and carbon bed source material and to introduce the compacted solid waste and carbon bed source material as a combined feed into the plasma gasifier reactor.

According to a second aspect of the present invention, there is provided an apparatus for processing solid waste (for example MSW) comprising both organic and inorganic waste material, the apparatus comprising a plasma gasifier reactor and a feed apparatus for feeding the solid waste into the plasma gasifier reactor, wherein the feed apparatus is a feed apparatus according to the first aspect. Preferably, the plasma gasifier reactor comprises:

a reactor vessel having an interior volume in which conversion of the solid waste to syngas and molten slag can take place;

a solid waste inlet port to which the feed device of the feed apparatus is connected and via which the combined feed of compacted solid waste and carbon bed source material can be charged into the vessel;

a carbon bed, located inside the reactor vessel below the solid waste port, on which newly charged solid waste and carbon bed source material rests, through which molten slag can flow, and which is replenished by the carbon bed source material;

one or more plasma torches, arranged and operable to supply thermal energy to the carbon bed and solid waste so as to generate a syngas from the carbon bed and the organic waste material and a molten slag from the inorganic waste material;

a slag outlet port at the bottom of the vessel, via which molten slag can be withdrawn from the vessel; and a syngas outlet port at the top of the vessel, via which syngas can be withdrawn from the vessel.

According to a third aspect of the present invention, there is provided a feed apparatus for feeding solid waste (for example MSW) comprising both organic and inorganic waste material into a plasma gasifier reactor, the feed apparatus comprising:

a scrubber system arranged and operable to receive a syngas stream from the plasma gasifier reactor, to contact the syngas stream with water to remove particulates from the syngas and form a sludge comprising water and removed particulates, and to add the sludge to the solid waste; and a feed device arranged and operable to receive the solid waste and sludge and introduce the solid waste and sludge as a combined feed into the plasma gasifier reactor.

According to a fourth aspect of the present invention, there is provided an apparatus for processing solid waste (for example MSW) comprising both organic and inorganic waste material, the apparatus comprising a plasma gasifier reactor and a feed apparatus for feeding the solid waste into the plasma gasifier reactor, wherein the feed apparatus is a feed apparatus according to the third aspect. Preferably, the plasma gasifier reactor comprises:

a reactor vessel having an interior volume in which conversion of the solid waste to syngas and molten slag can take place;

a solid waste inlet port to which the feed device of the feed apparatus is connected and via which the combined feed of solid waste and sludge can be charged into the vessel;

one or more plasma torches, arranged and operable to supply thermal energy to the solid waste and sludge so as to generate a syngas from the organic waste material and a molten slag from the inorganic waste material;

a slag outlet port at the bottom of the vessel, via which molten slag can be withdrawn from the vessel; and a syngas outlet port at the top of the vessel, via which syngas can be withdrawn from the vessel and supplied to the scrubber system of the feed apparatus.

In preferred embodiments of the first to fourth aspects of the present invention, the feed apparatus is a feed apparatus in accordance with both the first and third aspects of the invention. Thus, in a preferred embodiment the feed apparatus comprises:

a pre-compactor arranged and operable to receive the solid waste and to compact the solid waste to form a compacted solid waste;

a scrubber system arranged and operable to receive a syngas stream from the plasma gasifier reactor, to contact the syngas stream with water to remove particulates from the syngas and form a sludge comprising water and removed particulates, and to add the sludge to the solid waste and/or to the compacted solid waste;

a supply device arranged and operable to add a carbon bed source material to the compacted solid waste; and a feed device arranged and operable to receive the compacted solid waste, sludge and carbon bed source material and to introduce the compacted solid waste, sludge and carbon bed source material as a combined feed into the plasma gasifier reactor.

According to a fifth aspect of the present invention, there is provided a method of feeding solid waste (for example MSW) comprising both organic and inorganic waste material into a plasma gasifier reactor, the method comprising the steps of:

compacting the solid waste to form a compacted solid waste;

adding a carbon bed source material to the compacted solid waste to form a combined feed comprising the compacted solid waste and carbon bed source material; and introducing the combined feed into a plasma gasifier reactor;

wherein the solid waste contains also water and/or has water added thereto prior to being compacted to form a compacted solid waste, at least some (and more preferably all or substantially all) of said water being retained in the compacted solid waste and in the combined feed introduced into the plasma gasifier reactor.

According to a sixth aspect of the present invention, there is provided a method of processing solid waste (for example MSW) comprising both organic and inorganic waste material, the method comprising the steps of:

(i) compacting the solid waste to form a compacted solid waste;

(ii) adding a carbon bed source material to the compacted solid waste to form a combined feed comprising the compacted solid waste and carbon bed source material;

(iii) introducing the combined feed into a plasma gasifier reactor, the plasma gasifier reactor comprising:

a reactor vessel having an interior volume in which conversion of solid waste to syngas and molten slag can take place;

a solid waste inlet port via which the combined feed is charged into the vessel;

a carbon bed, located inside the reactor vessel below the solid waste port, on which newly charged solid waste and carbon bed source material rests, through which molten slag can flow, and which is replenished by the carbon bed source material;

one or more plasma torches;

a slag outlet port at the bottom of the vessel; and a syngas outlet port at the top of the vessel;

(iv) supplying thermal energy from the one or more plasma torches to the carbon bed and solid waste so as to generate a syngas from the carbon bed and the organic waste material and a molten slag from the inorganic waste material;

(v) withdrawing molten slag from the slag outlet port; and (vi) withdrawing syngas from the syngas outlet port;

wherein the solid waste contains also water and/or has water added thereto prior to being compacted to form a compacted solid waste, at least some (and more preferably all or substantially all) of said water being retained in the compacted solid waste and in the combined feed introduced into the plasma gasifier reactor.

According to a seventh aspect of the present invention, there is provided a method of feeding solid waste (for example MSW) comprising both organic and inorganic waste material into a plasma gasifier reactor, the method comprising the steps of:

contacting a syngas stream from the plasma gasifier reactor with water to remove particulates from the syngas and form a sludge comprising water and removed particulates;

adding the sludge to the solid waste to form a combined feed comprising the sludge and the solid waste; and introducing the combined feed into a plasma gasifier reactor.

According to an eighth aspect of the present invention, there is provided a method of processing solid waste (for example MSW) comprising both organic and inorganic waste material, the method comprising the steps of:

(i) adding a sludge to the solid waste to form a combined feed comprising the sludge and the solid waste;

(ii) introducing the combined feed into a plasma gasifier reactor, the plasma gasifier reactor comprising:

a reactor vessel having an interior volume in which conversion of the solid waste to syngas and molten slag can take place;

a solid waste inlet port via which the combined feed is charged into the vessel;

one or more plasma torches;

a slag outlet port at the bottom of the vessel; and a syngas outlet port at the top of the vessel;

(iii) supplying thermal energy from the one or more plasma torches to the solid waste and sludge so as to generate a syngas from the organic waste material and a molten slag from the inorganic waste material;

(iv) withdrawing molten slag from the slag outlet port;

(v) withdrawing a syngas stream from the syngas outlet port; and (vi) contacting the syngas stream with water to remove particulates from the syngas and form a sludge comprising water and removed particulates, which sludge is added to the solid waste in step (i).

According to a ninth aspect of the present invention, there is provided a method of processing solid waste (for example MSW) comprising both organic and inorganic waste material, the method comprising the steps of:

(i) introducing the solid waste into a plasma gasifier reactor, the plasma gasifier reactor comprising:
  a reactor vessel having an interior volume in which conversion of the solid waste to syngas and molten slag takes place, said interior volume comprising a gasification zone in which gasification of organic waste material takes place;
  a solid waste inlet port via which the solid waste is charged into the vessel;
  one or more plasma torches;
  a slag outlet port at the bottom of the vessel; and
  a syngas outlet port at the top of the vessel;
(ii) introducing a gaseous feed comprising molecular oxygen ($O_2$) into the gasification zone of the plasma gasifier reactor;
(iii) supplying thermal energy from the one or more plasma torches to the solid waste so as to generate a syngas from the organic waste material and a molten slag from the inorganic waste material;
(iv) withdrawing molten slag from the slag outlet port; and
(v) withdrawing syngas from the syngas outlet port;
wherein the solid waste introduced into the plasma gasifier reactor contains also water and/or the method further comprises introducing water into the gasification zone of the plasma gasifier reactor via a separate vapour or liquid feed, the mass ratio of water ($H_2O$) to molecular oxygen ($O_2$) entering the gasification zone being controlled so as to be from 0.5 to 2.0 (i.e. the water to molecular oxygen ratio is $\geq 0.5$ and $\leq 2.0$). More preferably, the mass ratio of water ($H_2O$) to molecular oxygen ($O_2$) entering the gasification zone is controlled so as to be from 0.8 to 1.8 (i.e. the water to molecular oxygen ratio is $\geq 0.8$ and $\leq 1.8$).

In preferred embodiments of the fifth and sevenths aspects of the present invention, the method is a method in accordance with both the fifth and seventh aspects of the present invention, and hence comprises the steps of: compacting the solid waste to form a compacted solid waste; contacting a syngas stream from the plasma gasifier reactor with water to remove particulates from the syngas and form a sludge comprising water and removed particulates; adding the sludge to the solid waste and/or to the compacted solid waste, and adding a carbon bed source material to the compacted solid waste, to form a combined feed comprising the compacted solid waste, sludge and carbon bed source material; and introducing the combined feed into a plasma gasifier reactor.

Likewise, in preferred embodiments of the sixth, eighth and ninth aspects of the present invention, the method is a method in accordance with any two or all three of the sixth, eighth and ninth aspects of the present invention. Thus, in preferred embodiments the method of processing solid waste may comprise in combination the steps and features of the sixth and eighth aspects as recited above, or the steps and features of the sixth and ninth aspects as recited above, or the steps and features of the eighth and ninth aspects as recited above, or the steps and features of the sixth, eighth and ninth aspects as recited above.

DETAILED DESCRIPTION OF THE INVENTION

Figure 1:
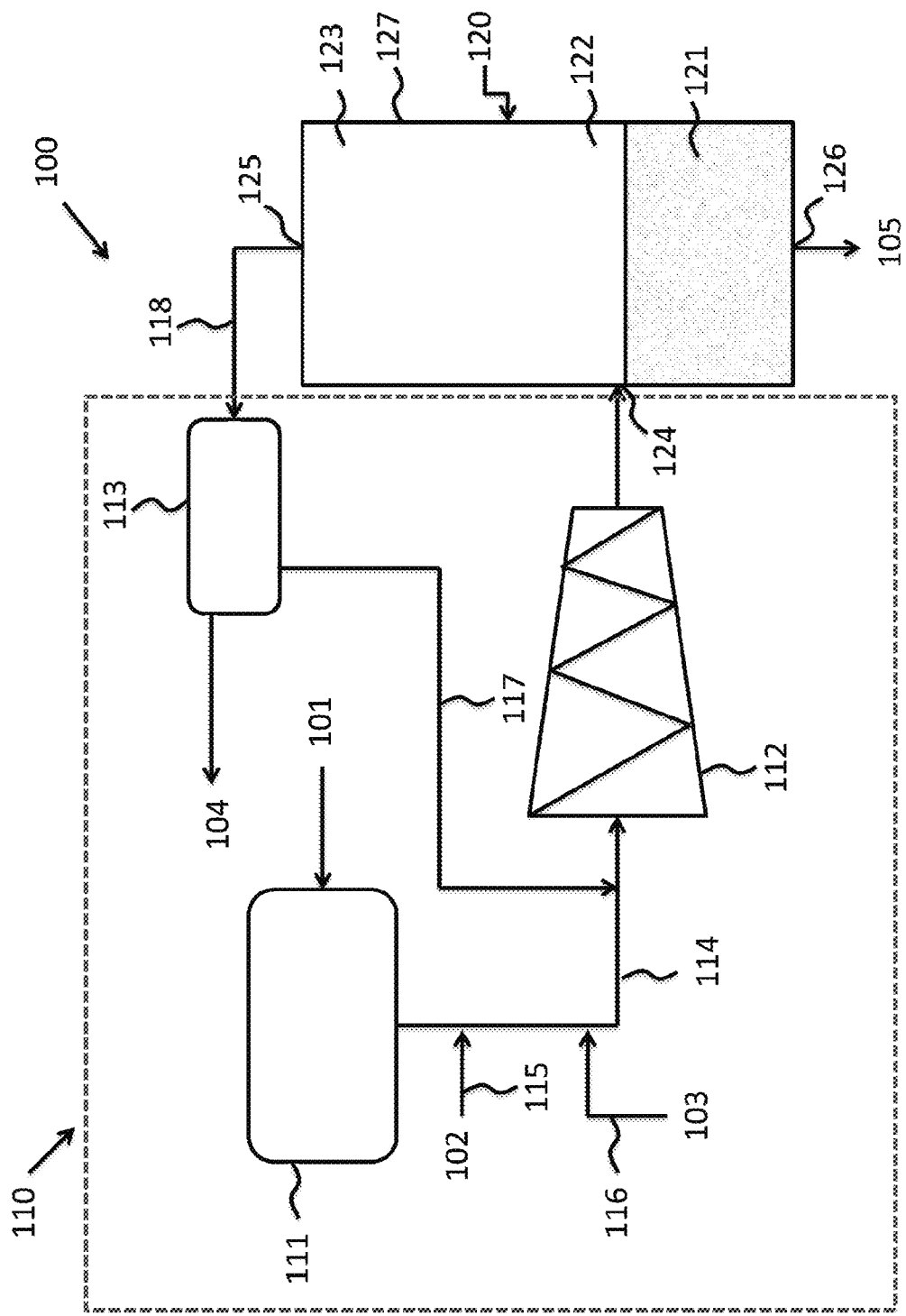
FIG. 1 is a schematic flow diagram depicting an apparatus and method, in accordance with an embodiment of the present invention, for feeding municipal solid waste (MSW) into a plasma gasifier reactor (PGR) and converting the MSW into a syngas and a slag.

Unless otherwise indicated, the articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Municipal solid waste (MSW) typically contains, in addition to organic and inorganic waste materials, at least some amount of water in the form of surface and/or inherent moisture present in or on said waste materials. The present inventors have found that it is advantageous, when processing MSW and/or other such types of solid waste in a plasma gasifier reactor (PGR), that the solid waste retains as much moisture (water content) as is practical. This is contrary to the teaching of certain prior art documents relating to waste gasification, such as for example that of US2010/0115841A which teaches a process for producing syngas from a carbonaceous substance (such as a municipal or agricultural waste) in which both the surface moisture and the inherent moisture of the carbonaceous substance is reduced prior to gasification of the carbonaceous substance. However, the inventors have found that, in the present plasma gasification processes, maintaining a higher water content in the solid waste feed provides a higher localized steam-carbon ratio during gasification which in turn results in more-complete gasification with lower concentrations of tars and heavy hydrocarbons. Alternatively or additionally, the amount of molecular oxygen used for gasification can be reduced, as it is in essence replaced by the oxygen in the retained water, resulting in a higher hydrogen concentration in the syngas that is produced.

Therefore, it is an objective of certain embodiments of the present invention to retain, or indeed increase, the water content of the solid waste as it is delivered into the gasification zone of the PGR. This can be achieved, in accordance with various embodiments of the invention, in a variety of complementary ways. Furthermore, it is an objective of certain embodiments of the present invention to utilize a water ($H_2O$) to molecular oxygen ($O_2$) ratio in the gasification zone of the PGR that optimizes hydrogen production and/or the concentration of hydrogen in the syngas.

Thus, in certain embodiments, the solid waste (i.e. the MSW or other type of solid waste comprising both organic and inorganic waste material) is first compacted in a pre-compactor to compress the solid waste. A carbon bed source material (e.g., met coke, anthracite coal) is then added to the compacted solid waste to form a combined feed to the PGR of carbon bed source material and compacted waste material. The carbon bed source material is added to the feed in order to replenish the carbon bed in the PGR, as will be described in more detail below. The compression (and hence densification) of the waste in the pre-compactor helps the waste to retain its moisture content as it is introduced into the high temperature gasification zone of the PGR. By adding the carbon bed source material after compaction of the solid waste in the pre-compactor has already taken place breakage of larger-size pieces (i.e. pieces of 1½ to 6 inches (4 to 15 cm) in diameter) of carbon bed source material into smaller-size pieces can be minimized, resulting in a carbon bed in the PGR that is more porous and less resistant to slag flow through its interstices. Hence, compacting the solid waste in a pre-compactor prior to the addition of the carbon-bed source material helps retain the moisture content of the waste (thereby providing the aforementioned benefits of a more complete gasification of the organic material and/or an increased hydrogen concentration in the syngas) without being detrimental to slag flow within the PGR. In circumstances where the solid waste that is to be processed does not contain, or contains less than a desired amount of water, water may be added to the solid waste to increase its moisture content prior to the waste being compacted in the pre-compactor. For example, the moisture content of the waste may be increased by adding a sludge, comprising water and particulates, to the solid waste, as will be discussed in further detail below.

Preferably, the combined feed of carbon bed source material and compacted solid waste is then fed into the PGR using a compression screw feeder or other type of feed device that compresses the combined feed as it introduces the combined feed into the PGR. This compression of the combined feed causes the feed to form a compacted plug of material entering the PGR vessel and creates a positive pressure differential between the feed device and the PGR vessel, thereby reducing the possibility of syngas or other gases escaping the PGR vessel via the solid waste inlet to the PGR vessel. In addition, the resulting further compaction of the waste again helps the solid waste to retain its moisture content. Also, where a pre-compactor and a screw feeder are used in combination in this manner the densification of the solid waste in the pre-compactor provides for an increase in the gravimetric feed rate of the screw feeder at any given rotational speed (and hence volumetric feed rate) of the screw feeder.

In certain embodiments, a sludge produced during the removal of overhead particulates from the syngas stream exiting the PGR is added to the solid waste (i.e. the MSW or other type of solid waste comprising both organic and inorganic waste material) prior to introduction of the solid waste and sludge as a combined feed into the PGR. The particulates present in the syngas stream exiting the PGR typically represent residual particles of organic and/or inorganic matter that have become entrained in the syngas existing the PGR, instead of being converted (as per the rest of the waste material introduced in the PGR) into and removed from the PGR as syngas or molten slag, and these particles typically need to be or are desired to be removed from the syngas before the syngas can be used as combustion fuel or in further processes to generate useful chemicals. The sludge, which is composed of water and the aforementioned removed particulates, has a higher water content than that of the solid waste, and thus the addition of the sludge to the solid waste serves to increase the overall water content of the feed to the PGR, as well as providing a means for the further processing and disposal of the particulates present in the sludge that have been removed from the syngas. The addition of the sludge to the solid waste is also particularly beneficial in those embodiments where, as described above, a pre-compactor and/or a compression screw feeder (or other feed device that compresses the feed as it is introduced into the PGR) is also used. The higher moisture level provided by the sludge helps to retain the higher density of the solid waste achieved during compaction of the solid waste in the pre-compactor and/or feed device (i.e., it helps reduce "spring back" of the waste material following compaction). This in turn increases the effectiveness of the aforementioned compaction steps in retaining the moisture content of the solid waste, in forming a plug of waste material entering the PGR vessel, and/or in increasing the gravimetric feed rate of the screw feeder.

The PGR that is used and present in certain embodiments of the present invention may be any form of PGR suitable for converting the solid waste to syngas (formed from the organic waste material) and molten slag (formed from the inorganic waste material). As with all PGRs, the thermal energy required to convert the solid waste to syngas and molten slag is supplied by one or more plasma torches, which are used to heat the interior of the PGR vessel (and hence supply thermal energy to the solid waste) by generating one or more plasma jets inside the reactor vessel. The plasma torches are typically located at or near the bottom of the bottom of the reactor vessel such that the plasma jets and thus the highest temperatures are generated at or near the bottom of the vessel, at or near the slag outlet port or ports via which molten slag is removed from the reactor vessel.

The interior of the PGR vessel typically comprises a gasification zone, in which the newly charged (i.e. the newly introduced) solid waste rests and in which gasification of organic waste material takes place. The operating conditions inside the gasification zone are such as are necessary for the gasification of the organic waste material to take place, and for the viscosity of the inorganic material to be lowered so as to at least begin its transformation into molten slag, such as for example a temperature of at least 900° C. (i.e. a temperature of 900° C.), more preferably a temperature of at least 1200° C., and a molecular oxygen concentration of at most 1.0 mole % (i.e. an $O_2$ concentration of $\leq 1.0$ mole %), more preferably a molecular oxygen concentration of at most 0.5 mole %. Typically, the interior of the reactor vessel further comprises a gas retention zone above the gasification zone, and which is thus at a lower temperature than the gasification zone, in which the syngas rising from the gasification zone is temporarily retained prior to exiting the reactor vessel via one or more syngas outlet ports at the top of the vessel, thereby allowing time for gas phase reactions to take place and/or for at least some of any particulates entrained in the syngas to be converted into syngas and/or to fall back down into the gasification zone. Typically, the reactor vessel also contains a carbon bed below the gasification zone which supports the newly charged solid waste, and through which molten slag can flow, the plasma torches being located such that the plasma jets are generated in or below the carbon bed, thereby heating and converting also the carbonaceous material in the carbon bed to syngas (the carbon bed being replenished by carbon bed source material which, as discussed above, is preferably introduced into the reactor vessel as part of a combined feed comprising also the solid waste). Typically the gasification zone is about half the height of the gas retention zone such that (excluding the area taken up by the carbon bed, where present) the gasification zone occupies about a third of the height of the reactor vessel interior with the gas retention zone occupying the remainder.

In certain embodiments, the solid waste inlet port (feed port) into the PGR vessel is located in the gasification zone such that the solid waste is introduced directly into the gasification zone. This is in contrast to conventional arrangements where solid waste is fed into the PGR vessel via a feed port located above the gasification zone, with the waste then free-falling into the higher-temperature gasification zone. An advantage of feeding the solid waste directly into the gasification zone of the PGR vessel is that the solid waste will again have retained more of its moisture content by the time it reaches the high-temperature gasification zone, as compared to the situation where solid waste is fed into the PGR vessel via a feed port above the gasification zone which may lead to the rapid evaporation of moisture from the waste as the waste free falls into the gasification zone. Again, the improvement in retained water content is particularly pronounced in those embodiments where the waste has also, in the manner described above, first been compacted and/or has had a sludge added thereto, as compared to a conventional arrangement where the waste is simply dumped "loose" into the gasification zone from a feed port located above the gasification zone.

In certain embodiments, the mass ratio of water ($H_2O$) to molecular oxygen ($O_2$) entering the gasification zone is controlled so as to be from 0.5 to 2.0, more preferably from 0.8 to 1.8. As discussed above, the inventors have found that by increasing amount of water that is present in the gasification zone, the amount of molecular oxygen that is required is reduced, and that by using in particular water to molecular oxygen ratios as recited above a more complete gasification (with resultant higher hydrogen production) and/or a higher hydrogen concentration in the syngas can be achieved. Preferably, the increased amount of water in the gasification zone is provided by increasing in one or more of the manners described above the water content of the feed of solid waste that is introduced into the gasification zone. However, alternatively or additionally, the water content in the feed of solid waste may be increased in any other way and/or water may be introduced into the gasification zone via a separate vapour or liquid feed (in the latter case it likewise being preferred that the separate vapour or liquid feed is introduced directly into the gasification zone via one or more ports located in the gasification zone, so as to thereby again avoid loss of water via evaporation prior to the water reaching the gasification zone). In preferred embodiments, the mass ratio of carbon (C) to molecular oxygen ($O_2$) entering the gasification zone is also controlled so as to be from 0.85 to 1.4, more preferably from 1.0 to 1.4. The inventors have found that by using such carbon to molecular oxygen ratios, in combination with the above mentioned water to molecular oxygen ratios, a higher hydrogen concentration in the syngas can in particular be achieved.

Thus, preferred aspects of the present invention include the following aspects, numbered #1 to #35:

1. A feed apparatus for feeding solid waste, comprising both organic and inorganic waste material, into a plasma gasifier reactor, the feed apparatus comprising:
a pre-compactor arranged and operable to receive the solid waste and to compact the solid waste to form a compacted solid waste;
a supply device arranged and operable to add a carbon bed source material to the compacted solid waste; and
a feed device arranged and operable to receive the compacted solid waste and carbon bed source material and to introduce the compacted solid waste and carbon bed source material as a combined feed into the plasma gasifier reactor.

2. The feed apparatus of Aspect #1, wherein the feed device is arranged and operable to compact the compacted solid waste and carbon bed source material and to introduce the resulting further compacted solid waste and carbon bed source material as a compacted combined feed into the plasma gasifier reactor.

3. The feed apparatus of Aspect #2, wherein the feed device comprises a compression screw feeder.

4. The feed apparatus of any one of Aspects #1 to #3, wherein the feed apparatus further comprises a scrubber system arranged and operable to receive a syngas stream from the plasma gasifier reactor, to contact the syngas stream with water to remove particulates from the syngas and form a sludge comprising water and removed particulates, and to add the sludge to the solid waste and/or compacted solid waste such that the combined feed also includes said sludge.

5. An apparatus for processing solid waste comprising both organic and inorganic waste material, the apparatus comprising a plasma gasifier reactor and a feed apparatus for feeding the solid waste into the plasma gasifier reactor, wherein:
the feed apparatus is a feed apparatus according to any one of Aspects #1 to #4; and
the plasma gasifier reactor comprises:
a reactor vessel having an interior volume in which conversion of the solid waste to syngas and molten slag can take place;
a solid waste inlet port to which the feed device of the feed apparatus is connected and via which the combined feed of compacted solid waste and carbon bed source material can be charged into the vessel;
a carbon bed, located inside the reactor vessel below the solid waste port, on which newly charged solid waste and carbon bed source material rests, through which molten slag can flow, and which is replenished by the carbon bed source material;
one or more plasma torches, arranged and operable to supply thermal energy to the carbon bed and solid waste so as to generate a syngas from the carbon bed and the organic waste material and a molten slag from the inorganic waste material;
a slag outlet port at the bottom of the vessel, via which molten slag can be withdrawn from the vessel; and
a syngas outlet port at the top of the vessel, via which syngas can be withdrawn from the vessel.

6. The apparatus of Aspect #5,
wherein the interior volume of the reactor vessel comprises a gasification zone in which gasification of organic waste material takes place, and a gas retention zone above the gasification zone, and
wherein the solid waste inlet port is located in the gasification zone of the vessel such that the combined feed is charged directly into the gasification zone.

7. A feed apparatus for feeding solid waste, comprising both organic and inorganic waste material, into a plasma gasifier reactor, the feed apparatus comprising:
a scrubber system arranged and operable to receive a syngas stream from the plasma gasifier reactor, to contact the syngas stream with water to remove particulates from the syngas and form a sludge comprising water and removed particulates, and to add the sludge to the solid waste; and
a feed device arranged and operable to receive the solid waste and sludge and introduce the solid waste and sludge as a combined feed into the plasma gasifier reactor.

8. The feed apparatus of Aspect #7, wherein the feed device is arranged and operable to compact the solid waste and sludge and to introduce the resulting compacted solid waste and sludge as a compacted combined feed into the plasma gasifier reactor.

9. The feed apparatus of Aspect #8, wherein the feed device comprises a compression screw feeder.

10. An apparatus for processing solid waste comprising both organic and inorganic waste material, the apparatus comprising a plasma gasifier reactor and a feed apparatus for feeding the solid waste into the plasma gasifier reactor, wherein:

the feed apparatus is a feed apparatus according to any one of Aspects #7 to #9; and the plasma gasifier reactor comprises:

a reactor vessel having an interior volume in which conversion of the solid waste to syngas and molten slag can take place;

a solid waste inlet port to which the feed device of the feed apparatus is connected and via which the combined feed of solid waste and sludge can be charged into the vessel;

one or more plasma torches, arranged and operable to supply thermal energy to the solid waste and sludge so as to generate a syngas from the organic waste material and a molten slag from the inorganic waste material;

a slag outlet port at the bottom of the vessel, via which molten slag can be withdrawn from the vessel; and a syngas outlet port at the top of the vessel, via which syngas can be withdrawn from the vessel and supplied to the scrubber system of the feed apparatus.

11. The apparatus of Aspect #10, wherein the interior volume of the reactor vessel comprises a gasification zone in which gasification of organic waste material takes place, and a gas retention zone above the gasification zone, and wherein the solid waste inlet port is located in the gasification zone of the vessel such that the combined feed is charged directly into the gasification zone.

12. A method of feeding solid waste, comprising both organic and inorganic waste material, into a plasma gasifier reactor, the method comprising the steps of:

compacting the solid waste to form a compacted solid waste;

adding a carbon bed source material to the compacted solid waste to form a combined feed comprising the compacted solid waste and carbon bed source material; and introducing the combined feed into a plasma gasifier reactor;

wherein the solid waste contains also water and/or has water added thereto prior to being compacted to form a compacted solid waste, at least some of said water being retained in the compacted solid waste and in the combined feed introduced into the plasma gasifier reactor.

13. The method of Aspect #12, wherein the method further comprises the step of compacting the combined feed prior to the resulting compacted combined feed being introduced into the plasma gasifier reactor.

14. The method of Aspect #13, wherein the combined feed is compacted and introduced into the plasma gasifier reactor using a compression screw feeder.

15. The method of any one of Aspects #12 to #14, wherein the method further comprises the steps of contacting a syngas stream from the plasma gasifier reactor with water to remove particulates from the syngas and form a sludge comprising water and removed particulates, and adding the sludge to the solid waste and/or compacted solid waste such that the combined feed includes also said sludge.

16. A method of processing solid waste comprising both organic and inorganic waste material, the method comprising the steps of:

(i) feeding according to the method of any one of Aspects #12 to #15 a combined feed comprising compacted solid waste and carbon bed source material into a plasma gasifier reactor, the plasma gasifier reactor comprising:

a reactor vessel having an interior volume in which conversion of solid waste to syngas and molten slag can take place;

a solid waste inlet port via which the combined feed is charged into the vessel;

a carbon bed, located inside the reactor vessel below the solid waste port, on which newly charged solid waste and carbon bed source material rests, through which molten slag can flow, and which is replenished by the carbon bed source material;

one or more plasma torches;

a slag outlet port at the bottom of the vessel; and a syngas outlet port at the top of the vessel;

(ii) supplying thermal energy from the one or more plasma torches to the carbon bed and solid waste so as to generate a syngas from the carbon bed and the organic waste material and a molten slag from the inorganic waste material;

(iii) withdrawing molten slag from the slag outlet port; and (iv) withdrawing syngas from the syngas outlet port.

17. The method of Aspect #16, wherein the interior volume of the reactor vessel comprises a gasification zone in which gasification of organic waste material takes place, and wherein the method further comprises introducing a gaseous feed comprising molecular oxygen into the gasification zone, the mass ratio of water to molecular oxygen entering the gasification zone of the plasma gasifier reactor being controlled so as to be from 0.5 to 2.0.

18. The method of Aspect #17, wherein the mass ratio of water to molecular oxygen entering the gasification zone of the plasma gasifier reactor is controlled so as to be from 0.8 to 1.8.

19. The method of Aspect #17 or #18, wherein the mass ratio of carbon to molecular oxygen entering the gasification zone of the plasma gasifier reactor is controlled so as to be from 0.85 to 1.4.

20. The method of Aspect #17 or #18, wherein the mass ratio of carbon to molecular oxygen entering the gasification zone of the plasma gasifier reactor is controlled so as to be from 1.0 to 1.4.

21. The method of any one of Aspects #16 to #20, wherein the interior volume of the reactor vessel comprises a gasification zone in which gasification of organic waste material takes place, and a gas retention zone above the gasification zone, and wherein the solid waste inlet port is located in the gasification zone of the vessel such that the combined feed is charged directly into the gasification zone.

22. A method of feeding solid waste, comprising both organic and inorganic waste material, into a plasma gasifier reactor, the method comprising the steps of:

contacting a syngas stream from the plasma gasifier reactor with water to remove particulates from the syngas and form a sludge comprising water and removed particulates;

adding the sludge to the solid waste to form a combined feed comprising the sludge and the solid waste; and introducing the combined feed into a plasma gasifier reactor.

23. The method of Aspect #22, wherein the method further comprises the step of compacting the combined feed prior to the resulting compacted combined feed being introduced into the plasma gasifier reactor.

24. The method of Aspect #23, wherein the combined feed is compacted and introduced in the plasma gasifier using a compression screw feeder.

25. A method of processing solid waste comprising both organic and inorganic waste material, the method comprising the steps of:

(i) feeding according to the method of any one of Aspects #22 to #24 a combined feed comprising sludge and solid waste into a plasma gasifier reactor, the plasma gasifier reactor comprising:
   a reactor vessel having an interior volume in which conversion of the solid waste to syngas and molten slag can take place;
   a solid waste inlet port via which the combined feed is charged into the vessel;
   one or more plasma torches;
   a slag outlet port at the bottom of the vessel; and
   a syngas outlet port at the top of the vessel;
(ii) supplying thermal energy from the one or more plasma torches to the solid waste and sludge so as to generate a syngas from the organic waste material and a molten slag from the inorganic waste material;
(iii) withdrawing molten slag from the slag outlet port; and
(iv) withdrawing a syngas stream from the syngas outlet port, which syngas stream is the stream contacted with water in accordance with the method of any one of Aspects #22 to #24.

26. The method of Aspect #25,
   wherein the interior volume of the reactor vessel comprises a gasification zone in which gasification of organic waste material takes place, and
   wherein the method further comprises introducing a gaseous feed comprising molecular oxygen into the gasification zone, the mass ratio of water to molecular oxygen entering the gasification zone of the plasma gasifier reactor being controlled so as to be from 0.5 to 2.0.

27. The method of Aspect #26, wherein the mass ratio of water to molecular oxygen entering the gasification zone of the plasma gasifier reactor is controlled so as to be from 0.8 to 1.8.

28. The method of Aspect #26 or #27, wherein the mass ratio of carbon to molecular oxygen entering the gasification zone of the plasma gasifier reactor is controlled so as to be from 0.85 to 1.4.

29. The method of Aspect #26 or #27, wherein the mass ratio of carbon to molecular oxygen entering the gasification zone of the plasma gasifier reactor is controlled so as to be from 1.0 to 1.4.

30. The method of any one of Aspects #25 to #29,
   wherein the interior volume of the reactor vessel comprises a gasification zone in which gasification of organic waste material takes place, and a gas retention zone above the gasification zone, and
   wherein the solid waste inlet port is located in the gasification zone of the vessel such that the combined feed is charged directly into the gasification zone.

31. A method of processing solid waste comprising both organic and inorganic waste material, the method comprising the steps of:
(i) introducing the solid waste into a plasma gasifier reactor, the plasma gasifier reactor comprising:
   a reactor vessel having an interior volume in which conversion of the solid waste to syngas and molten slag takes place, said interior volume comprising a gasification zone in which gasification of organic waste material takes place;
   a solid waste inlet port via which the solid waste is charged into the vessel;
   one or more plasma torches;
   a slag outlet port at the bottom of the vessel; and
   a syngas outlet port at the top of the vessel;
(ii) introducing a gaseous feed comprising molecular oxygen into the gasification zone of the plasma gasifier reactor;
(iii) supplying thermal energy from the one or more plasma torches to the solid waste so as to generate a syngas from the organic waste material and a molten slag from the inorganic waste material;
(iv) withdrawing molten slag from the slag outlet port; and
(v) withdrawing syngas from the syngas outlet port;
   wherein the solid waste introduced into the plasma gasifier reactor contains also water and/or the method further comprises introducing water into the gasification zone of the plasma gasifier reactor via a separate vapour or liquid feed, the mass ratio of water to molecular oxygen entering the gasification zone being controlled so as to be from 0.5 to 2.0.

32. The method of Aspect #31, wherein the mass ratio of water to molecular oxygen entering the gasification zone is controlled so as to be from 0.8 to 1.8.

33. The method of Aspect #31 or #32, wherein the mass ratio of carbon to molecular oxygen entering the gasification zone of the plasma gasifier reactor is controlled so as to be from 0.85 to 1.4.

34. The method of Aspect #31 or #32, wherein the mass ratio of carbon to molecular oxygen entering the gasification zone of the plasma gasifier reactor is controlled so as to be from 1.0 to 1.4.

35. The method of any one of Aspects #31 to #34, wherein interior volume of the reactor vessel further comprises a gas retention zone above the gasification zone, and wherein the solid waste inlet port and/or any inlet ports for the separate vapour or liquid feed, if present, are located in the gasification zone of the vessel such that the water is charged directly into the gasification zone.

Solely by way of example, a preferred embodiment of the invention will now be described with reference to the FIG. 1.

Referring to FIG. 1, an apparatus 100 and method for processing solid waste, comprising both organic and inorganic waste material, is shown. The apparatus 100 comprises a plasma gasifier reactor (PGR) 120 and a feed apparatus 110 for feeding the solid waste into the PGR. The feed apparatus includes a pre-compactor 111 for compacting the solid waste, a supply device 116 for supplying a carbon bed source material, a feed device 112 for feeding the compacted solid waste and carbon bed source material into the PGR, and a scrubber system 113 for removing particulates from the syngas produced by the PGR and recycling a sludge, composed of water and the removed particulates, into the solid waste feed to the PGR.

More specifically, solid waste 101 that is to be processed (e.g. municipal solid waste (MSW)) is first fed into pre-compactor 111 where it is compressed to form a densified, compacted solid waste, so as to help retain its moisture content. A carbon bed source material (e.g., met coke, anthracite coal) 103 and a sludge from scrubber system 113 are then added to the compacted solid waste via lines 116 and 117, respectively, to form a combined feed that is supplied to feed device 112 via line 114. As is depicted in FIG. 1, a fluxant (e.g. one or more inorganic fluxing agents, such as for example limestone) 102 may typically also be added to the solid waste, via line 115, and thus incorporated also in the combined feed that is supplied to feed device 112 via line 114. As is known in the art, one or more fluxants may be added to the feed as required in order to adjust and control the viscosity of the slag formed inside the PGR so that the required slag viscosity for proper operation of the PGR is maintained.

Lines 114 to 117 each represent any suitable form of supply device for supplying and conveying the materials in question. For example, line 114 may represent one or more moving ramps, conveyors, slides, chutes, conduits, hoppers or any other form of supply device suitable for transferring the compacted solid waste from pre-compactor 111 to feed device 112 and that allows the fluxant, carbon bed source material and sludge to be added to the compacted solid waste as it is transferred. Lines 115, 116 and 117 may for example likewise represent any suitable form of supply device (such as one or more moving ramps, conveyor, slides, chutes, conduits, hoppers and/or the like) for delivering, respectively, the fluxant, carbon bed source material and sludge. Although FIG. 1 shows the fluxant, carbon bed source material and sludge being added to the compacted solid waste prior to the combined feed being introduced into feed device 112, as an alternative one or more, or indeed all of the materials (i.e. the solid waste, fluxant, carbon bed source material and sludge) may be separately introduced into the feed device such that the combined feed is formed at the inlet to or in the feed device 112. In the case of the sludge and/or the fluxant, these materials may alternatively or additionally be added to the solid waste prior to it being fed into pre-compactor 111 (such that the pre-compactor compacts the solid waste together with the sludge and/or fluxant) . Although it would also be possible to add the carbon bed source material prior to compaction in the pre-compactor, it is much preferred that the carbon bed source material is added to the compacted solid waste after compaction in the pre-compactor has taken place. This is because, as discussed above, maintaining the large particle size of the carbon bed source material is essential for creating sufficient voidage in the carbon bed inside the PGR to allow slag to flow through the carbon bed freely, and adding the carbon bed source material after the pre-compactor helps minimize the breakage of these larger particles.

Feed device 112 is, in this embodiment, a tapered screw feeder (also referred to as tapered auger or tapered compression auger). Screw feeders of this type have a spiral flighting (also referred to as a spiral thread or screw blade) and matching (typically frustoconical) screw housing, both of which taper in the direction of travel of material through the feeder, as schematically shown for feed device 112 in FIG. 1. Thus as material is fed through the screw feeder by rotation of the screw it is also compressed. Suitable screw feeders of this type are known and readily available, such as the process screw feeders of the tapered compressor auger type that are available from Komar Industries, Inc. (4425 Marketing Place, Groveport, Ohio 43125, USA). In an alternative embodiment, an alternative design of compression screw feeder may be used, such as for example a screw feeder in which, in addition to or instead of a tapered screw flighting and housing being used, the screw feeder has a screw shaft the diameter of which increases in the direction of travel of the material through the feeder, and/or has screw flighting the pitch of which reduces in the direction of travel of the material through the feeder. In a yet alternative embodiment, another form of feed device that compacts material as it feeds it, such as for example a device incorporating a ram, may be used instead of or in addition to a screw feeder.

Consequently, as the combined feed of compacted solid waste, fluxant, carbon bed source material and sludge is fed into PGR 120 by feed device 112 it is also further compacted and densified, and allowed to increase in pressure to a pressure slightly higher than the pressure inside the PGR. The feed device 112, by compacting and densifying the feed material, creates a plug of material entering the PGR and a positive pressure gradient between the feed device and the PGR vessel, thereby ensuring that syngas from within the PGR vessel cannot leak out through the feed device. The maximum operating pressure inside PGR 120 will typically be up to 5 psig (136 kPa), meaning that the operating pressure inside the PGR may typically be up to 5 psi (35 kPa) above atmospheric pressure, and thus the design of the feed device is preferably such that it is suitable for feeding material against a back pressure of at least 5 psi (35 kPa).

Plasma gasifier reactor (PGR) 120 comprises a reactor vessel 127 having an interior volume in which conversion of the solid waste to syngas and molten slag can take place, a solid waste inlet port 124, a carbon bed 121 located inside the reactor vessel below the solid waste port, one or more plasma torches (not depicted), a slag outlet port 126 at the bottom of the vessel, and a syngas outlet port 125 at the top of the vessel. The reactor vessel 127 is typically made of a metal shell lined with refractory material capable of withstanding the intense heat generated inside the vessel by the plasma torches. The interior volume of the vessel above the carbon bed 121 may be divided into two zones, namely a gasification zone 122 above the carbon bed in which gasification of the organic waste material takes place, and a gas retention zone 123 above the gasification zone. The gasification zone 122 may be about half the height of the gas retention zone 123, such that the gasification zone occupies about a third of the height of the interior volume of the reactor vessel above the carbon bed 121, with the gas retention zone 123 occupying the remaining two thirds. The plasma torches may be located at the bottom of the reactor vessel 127, such that the plasma jets generated by the plasma torches are generated in or below the carbon bed 121, at or near the slag outlet port 126, so as to supply heat to the carbon bed and to waste material resting on the carbon bed in the gasification zone. The plasma torches may be supplied with any suitable carrier gas (for example air, oxygen enriched air, and or high purity oxygen) that is then converted by the plasma torch into a plasma jet by being passed through an electric arc, as is known in the art. The general design and operation of PGRs of this type is known in the art, PGRs of this type being for example described in US2010/0199556A and/or US2012/0121477A, the contents of which are incorporated herein by reference.

Figure 2:
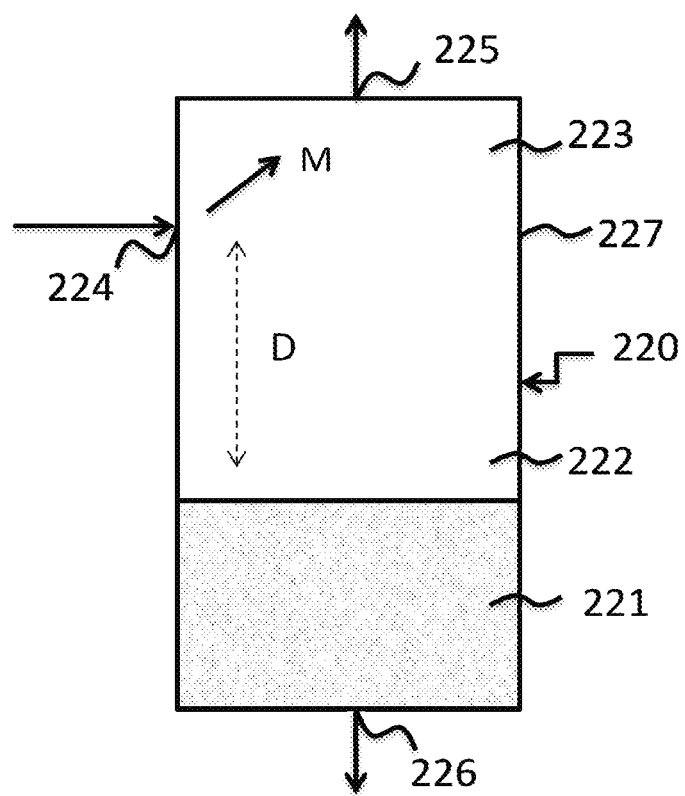
FIG. 2 is a schematic flow diagram depicting a conventional PGR, not in accordance with the present invention, for converting MSW to a syngas and a slag.

Feed device 112 is connected (either directly, or via an intervening conduit or the like) to the PGR solid waste inlet port 124. The solid waste inlet port is located in the gasification zone 122 of the PGR immediately above the carbon bed 121 such that the combined feed of compacted solid waste, fluxant, carbon bed source material and sludge is fed directly into the gasification zone 122 of PGR 120. This location of the solid waste inlet port is different to the conventional location of the solid waste inlet port in typical PGRs of this type, such as described in US2010/0199556A. More specifically, and as shown schematically in FIG. 2, in the conventional design of a PGR 220 of this type, the PGR vessel 227 may have the same general design as the PGR vessel 122 of FIG. 1, with the locations of carbon bed 221, slag outlet port 226, syngas outlet port 225, gas retention zone 223 and the gasification zone 222 being the same. However, in the conventional design the solid waste is fed (in non-compacted form) into the PGR vessel 227 via a solid waste inlet port 224 that is located at a point higher up the PGR vessel 227, such as in the gas retention zone 223 above the gasification zone 222. This means that the solid waste entering the PGR vessel has a greater distance to fall (distance D in FIG. 2) before landing in the gasification zone 222 on carbon bed 221, which in turn means that more moisture (depicted as arrow M in FIG. 2) is lost from the solid waste (as a result of drying of the falling waste by the rising syngas) before the solid waste can be converted in the gasification zone to syngas and slag.

Referring again to FIG. 1, the combined feed of compacted solid waste, fluxant, carbon bed source material and sludge entering the PGR vessel 127 via solid waste inlet port 124 comes to rest in the gasification zone 122, on top of and supported by the carbon bed 121. The solid waste is exposed in the gasification zone 122 to high temperatures (such as temperatures of at least 900° C., and more preferably at least 1200° C.), generated by the one or more plasma jets formed in or below the carbon bed 121 by the one or more plasma torches, in a low oxygen environment (i.e. an environment having an oxygen concentration that is not sufficient for combustion to take place, such as for example a molecular oxygen concentration of at most 1.0 mole %, and more preferably at most 0.5 mole %), leading to gasification of the organic waste material and melting of the inorganic waste material. The carbon bed is likewise subjected to high (indeed, even higher) temperatures by the one or more plasma torches, leading to the carbon bed also being gasified, the syngas generated by the carbon bed both serving to reduce the oxygen content in the gasification zone and serving to provide an additional source of syngas. However, the carbon bed is, as a result of the material (e.g., met coke, anthracite coal) from which it is formed, gasified more slowly than the organic waste material, such that the carbon bed can be replenished by the newly introduced carbon bed source material in the combined feed at the same rate as the carbon bed is gasified, and can thereby continue to act as a support for newly introduced waste material. Typically, the PGR 120 will also include one or more additional inlet ports (not shown), located in the gasification zone 122 of the vessel 127 and/or elsewhere, via which a gaseous feed comprising molecular oxygen (such as for example air, oxygen enriched air, high purity oxygen, or any other gas comprising oxygen) may be introduced into the gasification zone 122 as and if required in order to provide the levels of oxygen necessary for gasification of the organic waste material to take place. The PGR 120 may also include one or more additional inlet ports (preferably located in the gasification zone 122 of the vessel 127) via which additional water/steam feeds (i.e. separate liquid or vapour feeds of water) may be introduced, as and if necessary for efficient gasification of the organic waste material.

In preferred embodiments, the mass ratio of water ($H_2O$) to molecular oxygen ($O_2$) entering the gasification zone 122 is controlled so as to be from 0.5 to 2.0, more preferably from 0.8 to 1.8. The mass ratio of water to molecular oxygen can be controlled by, for example, measuring and monitoring the moisture content and mass flow rate of the combined feed of compacted solid waste, fluxant, carbon bed source material and sludge entering the PGR vessel 127, by monitoring the mass flow rate of the gaseous feed comprising molecular oxygen (and the mass flow rate of any additional water/steam feeds) and the composition of said gaseous feed (if not already known from supplier specifications), and by adjusting the flow rate of the gaseous feed comprising molecular oxygen and/or the flow rate of any additional water/steam feeds if and as necessary. The moisture content of the combined feed can be measured using a loss on drying method (where a sample of the material is weighed, heated for an appropriate time period and weighed again, with the moisture content then being calculated from the moisture loss rate that is in turn calculated from the time period of heating and the weight of the sample before and after heating), such as for example via ASTM method ASTM-D3302. The mass flow rates of materials making up the combined feed (i.e. the solid waste, fluxant, carbon bed source material and sludge) and the mass flow rates of the gaseous feed and any additional water/steam feeds can be measured using any suitable standard flow rate monitors, such as are well known in the art.

In preferred embodiments, the mass ratio of carbon (C) to molecular oxygen ($O_2$) entering the gasification zone 122 is also controlled, so as to be from 0.85 to 1.4, more preferably from 1.0 to 1.4. The mass ratio of carbon to oxygen can be controlled by, for example measuring and monitoring the carbon content and mass flow rate of the combined feed of compacted solid waste, fluxant, carbon bed source material and sludge entering the PGR vessel 127, by monitoring the mass flow rate and (if not already known) composition of the gaseous feed comprising molecular oxygen, and by adjusting the flow rate of the gaseous feed comprising molecular oxygen if and as necessary. The carbon content of the solid waste and sludge, and (if not already known from supplier specifications) the carbon content of the fluxant and carbon bed source material, can be measured using 'ultimate analysis' testing, such as for example via ASTM methods ASTM D5373 and/or ASTM D5291.

The molten slag generated from the inorganic waste material and the fluxant (added to the extent necessary in order to adjust the viscosity of the slag to the desired viscosity) flows through the carbon bed 121 to the bottom of the PGR vessel 127, where it can be withdrawn from the vessel via slag outlet port 126 and subsequently cooled and disposed of. The syngas generated from the inorganic waste material (and carbon bed) rises inside the PGR vessel into the gas retention zone 123, where the temperature of the gas cools somewhat and in which zone further gas phase reactions can take place. The syngas is then withdrawn from the PGR vessel 127 via syngas port 125 and transferred by conduit 118 to scrubber system 113.

In scrubber system 113 the syngas is contacted with a water supply (not shown) to strip out any particulates (also referred to herein as retained or overhead particulates) that were entrained and retained by the syngas as it was generated in the gasification zone 122 and rose inside the PGR vessel 127 through the gas retention zone 123. The particulate free syngas 104 can then be further processed and/or used as desired. The sludge or slurry of water and particulates formed by removing said particulates from the syngas is then recycled, as described above, via line 117 to form part of the combined feed to the PGR (alongside the compacted solid waste, fluxant and carbon bed source material). Because the sludge has a higher water content than the solid waste 101, the recycling of the sludge to form part of combined feed serves to increase the water content of the combined feed, as compared to what would be the water content of the combined feed if the sludge were not included.

EXAMPLES

In order to demonstrate the effects of increasing, in accordance with the embodiments of the present invention, the water content of the solid waste feed to the gasification zone of a plasma gasifier reactor, an equilibrium-based ASPEN simulation was conducted using ASPEN™ Plus software (© Aspen Technology, Inc.). The following tables show the results from this simulation, and illustrate the impact of increasing the water content of the feed on hydrogen production:

TABLE 1

| | | | | | | |
|---|---|---|---|---|---|---|
| MSW feed (dry) kg/hr | 32000 | 32000 | 32000 | 32000 | 32000 | 32000 |
| MSW feed moisture kg/hr | 3556 | 5647 | 8000 | 10667 | 13714 | 21333 |
| MSW feed (total) kg/hr | 35556 | 37647 | 40000 | 42667 | 45714 | 53333 |
| MSW wt % moisture | 10 | 15 | 20 | 25 | 30 | 40 |
| Met coke kg/hr | 2600 | 2600 | 2600 | 2600 | 2600 | 2600 |
| Limestone (fluxant) kg/hr | 2540 | 2540 | 2540 | 2540 | 2540 | 2540 |
| Air feed kg/hr | 7140 | 7140 | 7140 | 7140 | 7140 | 7140 |
| Oxygen feed kg/hr | 16558 | 16558 | 16558 | 16558 | 16558 | 16558 |
| atomic equivalents of O/hr | 2475 | 2591 | 2722 | 2870 | 3040 | 3463 |
| molecular $O_2$ kg/hr | 18222 | 18222 | 18222 | 18222 | 18222 | 18222 |
| mass ratio $H_2O/O_2$ | 0.20 | 0.31 | 0.44 | 0.59 | 0.75 | 1.17 |
| Mass ratio $C/O_2$ | 0.82 | 0.82 | 0.82 | 0.82 | 0.82 | 0.82 |
| Syngas Mole Flow kmol/hr | | | | | | |
| $H_2$ | 587.515 | 613.363 | 640.128 | 667.963 | 697.041 | 759.857 |
| $H_2O$ | 432.879 | 523.088 | 626.925 | 747.121 | 887.169 | 1247.257 |
| CO | 1036.502 | 1010.653 | 983.888 | 956.053 | 926.975 | 864.159 |
| $CO_2$ | 201.091 | 226.952 | 253.728 | 281.575 | 310.664 | 373.501 |
| $O_2$ | 0.000 | 0.000 | 0.000 | 0.000 | 0.000 | 0.000 |
| $N_2$ | 217.861 | 217.861 | 217.861 | 217.861 | 217.861 | 217.861 |
| Syngas Mole Fraction | | | | | | |
| $H_2$ | 0.236 | 0.236 | 0.234 | 0.232 | 0.229 | 0.219 |
| $H_2O$ | 0.174 | 0.201 | 0.230 | 0.259 | 0.291 | 0.359 |
| CO | 0.417 | 0.389 | 0.360 | 0.332 | 0.304 | 0.249 |
| $CO_2$ | 0.081 | 0.087 | 0.093 | 0.098 | 0.102 | 0.108 |
| $O_2$ | 0.000 | 0.000 | 0.000 | 0.000 | 0.000 | 0.000 |
| $N_2$ | 0.088 | 0.084 | 0.080 | 0.076 | 0.071 | 0.063 |
| Total Syngas Flow kmol/hr | 2484.627 | 2600.697 | 2731.311 | 2879.354 | 3048.491 | 3471.416 |
| Gasification Zone Temperature (C.) | 1500 | 1500 | 1500 | 1500 | 1500 | 1500 |

TABLE 2

| | | | | | | |
|---|---|---|---|---|---|---|
| MSW feed (dry), kg/hr | 32000 | 32000 | 32000 | 32000 | 32000 | 32000 |
| MSW feed moisture, kg/hr | 3556 | 5647 | 8000 | 10667 | 13714 | 21333 |
| MSW feed (total) kg/hr | 35556 | 37647 | 40000 | 42667 | 45714 | 53333 |
| MSW, wt % moisture | 10 | 15 | 20 | 25 | 30 | 40 |
| Met coke, kg/hr | 2600 | 2600 | 2600 | 2600 | 2600 | 2600 |
| Limestone (fluxant), kg/hr | 2540 | 2540 | 2540 | 2540 | 2540 | 2540 |
| Air feed, kg/hr | 7140 | 7140 | 7140 | 7140 | 7140 | 7140 |
| Oxygen feed, kg/hr | 18534 | 17604 | 16558 | 15373 | 14019 | 10632 |
| atomic equivalents of O/hr | 2722 | 2722 | 2722 | 2722 | 2722 | 2722 |
| molecular $O_2$, kg/hr | 20197 | 19268 | 18222 | 17037 | 15682 | 12296 |
| mass ratio $H_2O/O_2$ | 0.18 | 0.29 | 0.44 | 0.63 | 0.87 | 1.73 |
| Mass ratio $C/O_2$ | 0.74 | 0.77 | 0.82 | 0.87 | 0.95 | 1.21 |
| Syngas Mole Flow kmol/hr | | | | | | |
| $H_2$ | 516.153 | 574.509 | 640.128 | 714.446 | 799.322 | 1011.486 |
| $H_2O$ | 504.256 | 561.949 | 626.925 | 700.632 | 784.876 | 995.607 |
| CO | 984.356 | 984.128 | 983.888 | 983.637 | 983.390 | 982.926 |
| $CO_2$ | 253.222 | 253.470 | 253.728 | 253.997 | 254.260 | 254.753 |
| $O_2$ | 0.000 | 0.000 | 0.000 | 0.000 | 0.000 | 0.000 |
| $N_2$ | 217.861 | 217.861 | 217.861 | 217.861 | 217.861 | 217.860 |

TABLE 2-continued

| Syngas Mole Fraction | | | | | | |
|---|---|---|---|---|---|---|
| H2 | 0.208 | 0.221 | 0.234 | 0.248 | 0.262 | 0.291 |
| H2O | 0.203 | 0.216 | 0.230 | 0.243 | 0.257 | 0.287 |
| CO | 0.396 | 0.378 | 0.360 | 0.342 | 0.323 | 0.283 |
| CO2 | 0.102 | 0.097 | 0.093 | 0.088 | 0.083 | 0.073 |
| O2 | 0.000 | 0.000 | 0.000 | 0.000 | 0.000 | 0.000 |
| N2 | 0.088 | 0.084 | 0.080 | 0.076 | 0.071 | 0.063 |
| Total Syngas Flow kmol/hr | 2484.628 | 2600.698 | 2731.311 | 2879.354 | 3048.490 | 3471.415 |
| Gasification Zone Temperature (C.) | 1500 | 1500 | 1500 | 1500 | 1500 | 1500 |

As can be seen from Table 1, as the moisture content ($H_2O$ content) of the MSW feed is increased, thereby increasing the $H_2O/O_2$ mass ratio, so too does the hydrogen production (i.e., $H_2$ kmol/hr) of the process. As can be seen from Table 2, if the moisture content ($H_2O$ content) of the MSW feed is increased and at the same time the amount of molecular oxygen ($O_2$), supplied in this case by air and high purity oxygen feeds, is decreased by a corresponding amount to maintain a constant value for atomic equivalents of oxygen used by the process, thereby increasing also the $C/O_2$ ratio, both the hydrogen production (i.e., $H_2$ kmol/hr) and the hydrogen concentration in the resulting syngas (i.e., $H_2$ mole fraction) is increased.

It will be appreciated that the invention is not restricted to the details described above with reference to the preferred embodiments but that numerous modifications and variations can be made without departing from the spirit or scope of the invention as defined in the following claims.

The invention claimed is:

1. A method of processing solid waste comprising both organic and inorganic waste material, the method comprising the steps of:
   (i) compacting the solid waste to form a compacted solid waste;
   (ii) adding a carbon bed source material and a sludge material to the compacted solid waste to form a combined feed comprising the compacted solid waste, carbon bed source material, and the sludge material;
   (iii) compacting the combined feed using a compression screw feeder to create a compressed combined feed;
   (iv) introducing the compressed combined feed into a plasma gasifier reactor, the plasma gasifier reactor comprising:
      a reactor vessel having an interior volume in which conversion of solid waste to syngas and molten slag can take place;
      a solid waste inlet port via which the combined feed is charged into the vessel; a carbon bed, located inside the reactor vessel below the solid waste port, on which newly charged solid waste and carbon bed source material rests, through which molten slag can flow, and which is replenished by the carbon bed source material;
      one or more plasma torches;
      a slag outlet port at the bottom of the vessel; and
      a syngas outlet port at the top of the vessel;
   (v) supplying thermal energy from the one or more plasma torches to the carbon bed and solid waste so as to generate a syngas from the carbon bed and the organic waste material and a molten slag from the inorganic waste material;
   (vi) withdrawing molten slag from the slag outlet port;
   (vii) withdrawing syngas from the syngas outlet port; and
   (viii) contacting the syngas stream with water to remove particulates from the syngas stream and form a sludge material comprising water and removed particulates.

2. The method of claim 1, wherein the interior volume of the reactor vessel comprises a gasification zone in which gasification of organic waste material takes place, and wherein the method further comprises introducing a gaseous feed comprising molecular oxygen into the gasification zone, the mass ratio of water to molecular oxygen entering the gasification zone of the plasma gasifier reactor being controlled so as to be from 0.5 to 2.0.

3. The method of claim 2, wherein the mass ratio of water to molecular oxygen entering the gasification zone of the plasma gasifier reactor is controlled so as to be from 0.8 to 1.8.

4. The method of claim 2, wherein the mass ratio of carbon to molecular oxygen entering the gasification zone of the plasma gasifier reactor is controlled so as to be from 0.85 to 1.4.

5. The method of claim 2, wherein the mass ratio of carbon to molecular oxygen entering the gasification zone of the plasma gasifier reactor is controlled so as to be from 1.0 to 1.4.

6. The method of claim 1, wherein the interior volume of the reactor vessel comprises a gasification zone in which gasification of organic waste material takes place, and a gas retention zone above the gasification zone, and wherein the solid waste inlet port is located in the gasification zone of the vessel such that the combined feed is charged directly into the gasification zone.

7. A method of processing solid waste comprising both organic and inorganic waste material, the method comprising the steps of:
   (a) providing a solid waste feed at a solid waste flow rate, the solid waste feed having a solid waste moisture content;
   (b) compacting the solid waste feed to form a compacted solid waste;
   (c) adding to the compacted solid waste a carbon bed source material at a carbon bed mass flow rate and a sludge material at a sludge mass flow rate to produce a combined feed having a combined feed moisture content, wherein the combined feed moisture content is greater than the solid waste moisture content;
   (d) feeding the combined feed into a compactor at a combined feed mass flow rate to form a compacted combined feed;
   (e) feeding the compacted combined feed into a plasma gasifier reactor, thereby generating a syngas stream and a slag stream;

(f) feeding a gaseous feed comprising molecular oxygen into the plasma gasifier reactor at a gaseous feed flow rate;

(g) contacting the syngas stream with water to separate the syngas stream into a sludge material and a particulate-depleted syngas stream, the sludge material comprising water and particulates removed from the syngas stream, the sludge material having a sludge moisture content, the sludge moisture content being greater than the combined feed moisture content;

(h) monitoring a ratio of water to molecular oxygen in the plasma gasification reactor; and (i) adjusting at least one selected from the group of: the solid waste mass flow rate, the sludge material mass flow rate, the combined feed mass flow rate, and the gaseous feed flow rate, in order to maintain the ratio of water to oxygen in the plasma gasification reactor within a desired range.

8. The method of claim 7, wherein step (h) comprises:

(h) adjusting at least one selected from the group of: the solid waste mass flow rate, the sludge material mass flow rate, the combined feed mass flow rate, and the gaseous feed flow rate, in order to maintain the ratio of water to oxygen in the plasma gasification reactor between 0.5 and 2.0.

9. The method of claim 7, wherein step (h) comprises:

(h) adjusting at least one selected from the group of: the solid waste mass flow rate, the sludge material mass flow rate, the combined feed mass flow rate, and the gaseous feed flow rate, in order to maintain the ratio of water to oxygen in the plasma gasification reactor between 0.8 and 1.8.

10. The method of claim 7 further comprising:

(i) monitoring a ratio of carbon to molecular oxygen in the plasma gasification reactor;

(j) adjusting at least one selected from the group of: the solid waste mass flow rate, the sludge material mass flow rate, the combined feed mass flow rate, and the gaseous feed flow rate, in order to maintain the ratio of carbon to oxygen in the plasma gasification reactor between 0.85 and 1.4.

11. The method of claim 10, wherein step (j) comprises:

(j) adjusting at least one selected from the group of: the solid waste mass flow rate, the sludge material mass flow rate, the combined feed mass flow rate, and the gaseous feed flow rate, in order to maintain the ratio of carbon to oxygen in the plasma gasification reactor between 1.0 and 1.4.

* * * * *